United States Patent [19]

Lauvray et al.

[11] Patent Number: 5,704,958
[45] Date of Patent: Jan. 6, 1998

US005704958A

[54] PROCESS FOR THE TREATMENT OF A GLASS TO REDUCE ITS WETTABILITY BY GALLIUM AND AN APPARATUS PRODUCED FROM SUCH A TREATED GLASS

[75] Inventors: Hubert Lauvray, Paris; Jean-Charles Maurice, Le Perreux-sur-Marne; Jean-Louis Sabot, Maisons Laffitte, all of France

[73] Assignee: Rhone-Poulenc Chimie, Courbevoie, France

[21] Appl. No.: 592,275

[22] Filed: Jan. 26, 1996

[30] Foreign Application Priority Data

Jan. 30, 1995 [FR] France ................................ 95 01014

[51] Int. Cl.$^6$ .................................................. C03C 17/30
[52] U.S. Cl. ................................ 65/30.1; 65/24; 65/26
[58] Field of Search ............................ 65/24, 26, 30.1

[56] References Cited

U.S. PATENT DOCUMENTS

| | | | |
|---|---|---|---|
| 5,256,749 | 10/1993 | Hickel et al. | 526/279 |
| 5,391,846 | 2/1995 | Taylor et al. | 200/233 |

FOREIGN PATENT DOCUMENTS

| | | |
|---|---|---|
| 0 498 335 | 8/1992 | European Pat. Off. . |
| 4 227 434 | 2/1994 | Germany . |

OTHER PUBLICATIONS

Rieder et al. Siliconisierte Glasoberflachen, Glastechnische Berichte vol. 51, No. 3, pp. 55–61, (1978–03).

J. D. Wofford, Reversing Glass Wettability, N.T.I.S. Tech Notes No.: 10, Oct. 19985 Springfield VA US, p. 1205.

C. A., vol. 98, No. 4, Jan. 1983, Deyhimi et al. Rapid Silylation of a Glass Surface, vol. 65 No. 6, 1982, pp. 1752–1759.

*Primary Examiner*—Donald E. Czaja
*Assistant Examiner*—Sean Vincent
*Attorney, Agent, or Firm*—Katherine L. Carleton

[57] ABSTRACT

A process for the treatment of a glass to reduce or remove its wettability by gallium is provided, wherein the glass is treated with a silyling agent. Also is provided an apparatus comprising at least one hollow element containing a gallium or gallium based alloy or in which a gallium or gallium based alloy can circulate, wherein the glass forming the hollow element has been treated using the process. The apparatus may be thermometer, barometer or electric switch.

8 Claims, No Drawings

PROCESS FOR THE TREATMENT OF A GLASS TO REDUCE ITS WETTABILITY BY GALLIUM AND AN APPARATUS PRODUCED FROM SUCH A TREATED GLASS

The present invention concerns a process for the treatment of a glass to reduce or remove its wettability by gallium and an apparatus produced from such a treated glass.

Liquid mercury has numerous applications, for example in thermometers and barometers. However, because of the toxic nature of this element, a substitute product is being researched, particularly for use in instruments used by the general public in order to limit or prevent the dispersion of mercury into the environment.

Gallium or gallium-rich alloys have been proposed. Their melting point means they are liquids which could replace mercury in thermometers. Further, mercury and gallium have many analogous physical properties.

However, there is a major problem with gallium and its alloys. They wet glass to the extent that they practically irreversibly form an adhesive film. This behaviour renders gallium and its alloys unusable in the applications described above.

The substitution of gallium for mercury thus poses a real problem.

The object of the present invention is to resolve that problem.

The invention thus provides a process for the treatment of a glass to reduce or remove its wettability by gallium or a gallium based alloy, characterized in that the glass is treated with a silyling agent.

The invention also concerns an apparatus comprising at least one glass element in contact with or for contact with gallium or a gallium based alloy, characterized in that the glass forming that element has been treated by the above process.

Further features, details and advantages of the invention will become clear from the following description and the non limiting example which illustrates the invention.

The invention lies in a glass treatment process. Glass is known to have a specific surface chemistry which involves chemisorption phenomena. Without being bound by one theory, it can be considered that during contact of glass with gallium or a gallium based alloy, interactions or chemical reactions are set up between them. The origin of these interactions or reactions may be in the presence of silanol groups Si—OH at the glass surface can be represented as having the following configuration:

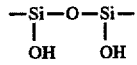

The process of the invention transforms the Si—OH bonds to render them inactive towards gallium.

It should be noted here that the whole of the description of the invention is applicable to gallium and to all gallium based alloys which can be used for the applications concerned. In the following description, the term "gallium" should be construed as also including alloys based on this element.

The alloys will be selected depending on the physical properties required for the intended application, in particular the melting point, boiling point and vapour tension.

Particular examples of alloys are those based on gallium and indium. These alloys may contain smaller proportions of other elements, in particular tin, silver, bismuth and antimony. As an example, alloys with the following proportions can be used: Ga 59–95%, In 5–25%, Sn 0–16%, with the other elements mentioned above being present in proportions of up to about 5%.

The present invention is applicable to all glasses which have surface silanol groups or, more generally, hydroxy groups —OH. More particular examples are $SiO_2$ based glasses and silicate type glasses which, in addition to $SiO_2$, contain at least one other element selected from $Al_2O_3$, $B_2O_3$, $Li_2O_3$, $Na_2O$, $K_2O$, MgO, CaO, BaO, PbO and ZnO. $SiO_2$ is not necessarily the major element. More particular examples are borosilicates.

The glass treatment of the invention is carried out using a silyling agent. The term "silyling agent" means any agent which can replace the hydrogen from a M—OH bond, M being a chemical element which forms part of the glass composition, for example Si, with a silyl group.

Silyling agents are well known. They are generally trialkyl silane halides or silane compounds containing nitrogen. Examples are trimethylchlorosilane (TMCS), dimethylchlorosilane (DMCS), trimethyliodosilane, hexamethyldisilazane (HMDZ), chloromethyldimethylchlorosilane, N,N'-bis(trimethylsilyl)urea, N-trimethylsilyldiethylamine, N-trimethylsilylimidazole, N,O-bis(trimethylsilyl)acetimide (BSA), N,O-bis(trimethylsilyl)trifluoroacetamide, N-methyl-N-trimethylsilyltrifluoroacetamide, t-butyldimethylsilylimidazole, N-trimethylsilylacetamide, and N,O-bis(trimethylsilyl)carbamate.

The glass can be treated using any suitable method. This treatment may consist of bringing the glass into contact with a solution containing the silyling agent. The glass may have already been washed with water and degreased with an organic solvent. The treatment can be carried out at a temperature between room temperature and 80° C. Following this treatment, the glass may be rinsed again with an organic solvent to eliminate excess silyling agent, followed by drying. Drying can be carried out at a temperature in the range 60° C. to 120° C.

The invention also concerns an apparatus comprising at least one glass element in contact with or for contact with gallium or a gallium based alloy in which the glass has been treated as described above.

More particularly, the element is a hollow element which contains the gallium or in which the gallium can circulate, such as a capillary, a tube or a reservoir. The apparatus may be, for example, a thermometer, barometer or an electric switch.

In one particular implementation of the invention, in the case of a hollow element as described above which delimits a space containing or for containing gallium, the atmosphere in this element is such that the oxygen content is at most 20 ppm, for example in the range 10 ppm to 20 ppm, preferably at most 2 ppm. To ensure these conditions, the glass element may contain an inert gas, for example argon, helium, hydrogen or nitrogen. The inert gas prevents the oxidation of the gallium.

Finally, the invention concerns the production of an apparatus as described above using a glass which has been treated using the process described above.

A non limiting example will now be described.

EXAMPLE

A 100 ml "Pyrex" glass flask was treated as follows:

surface washing and degreasing using a 10% Decon$^R$ solution in water;

rinsing with water;

rinsing with acetone;

oven drying at 90° C.;

washing at 70° C. for one hour with a silyling agent (N,O-bis(trimethylsilyl)trifluoroacetamide), 60% in acetontirile, and containing less than 0.01% water;

washing with acetonitrile then with methanol to pH 7;

rinsing with acetone;

oven drying at 90° C.

10 g of gallium with a purity of more than 99% was introduced into the flask and vigorously stirred. When the stirring was stopped, the gallium collected in the bottom of the flask.

After the same test without treating the glass, the gallium adhered to the entire wall of the flask as a thin film.

What is claimed is:

1. A process for the treatment of a glass to reduce or remove its wettability by gallium or a gallium based alloy, comprising the steps of treating the glass with a silyling agent.

2. The process according to claim 1, wherein the glass is treated by soaking it in a solution containing a silyling agent.

3. An apparatus comprising at least one hollow glass element which delimits a space containing gallium or a gallium based alloy, wherein the glass forming the hollow element has been treated with a silyling agent.

4. The apparatus according to claim 3, wherein the hollow element further contains an atmosphere of an inert gas.

5. The apparatus according to claim 3 in the form of a thermometer, barometer or electric switch.

6. The process according to claim 1, wherein the silyling agent is N,O-bis(trimethylsilyl)acetimide, N-methyl-N-trimethylsilyltrifluoroacetamide or N-trimethylsilylacetamide.

7. The process according to claim 1, further comprising the step of drying said glass.

8. The process according to claim 7, wherein said drying is carried out at a temperature in the range of 60° C. to 120° C.

* * * * *